United States Patent [19]

Gleason

[11] Patent Number: 5,044,536
[45] Date of Patent: Sep. 3, 1991

[54] SHIELD

[76] Inventor: Dean Gleason, P.O. Box 11614, Zephyr Cove, Nev. 89448

[21] Appl. No.: 382,229

[22] Filed: Jul. 20, 1989

[51] Int. Cl.⁵ .......................... B60R 9/05; B62J 11/00
[52] U.S. Cl. ................................ 224/30 R; 224/316; 296/78.1
[58] Field of Search ............... 224/30 R, 30 A, 32 R, 224/36, 39, 41, 309, 316, 319, 328; 180/903; 280/770; 296/78.1

[56] References Cited

U.S. PATENT DOCUMENTS

| | | | |
|---|---|---|---|
| 2,396,493 | 3/1946 | Comiskey, Sr. | 296/78.1 |
| 2,401,245 | 5/1946 | Hobbs | 224/36 X |
| 3,561,815 | 2/1971 | Stone | 296/78.1 |
| 3,801,152 | 4/1974 | Tims et al. | 296/78.1 |
| 3,828,993 | 8/1974 | Carter | 224/323 X |
| 3,904,236 | 9/1975 | Johnson et al. | 224/316 X |
| 3,968,913 | 7/1976 | Weed et al. | 296/78.1 X |
| 4,206,942 | 6/1980 | Nudo et al. | 180/313 X |
| 4,607,874 | 8/1986 | Peairs | 180/903 X |
| 4,655,497 | 4/1987 | Mallett | 296/78.1 |
| 4,813,583 | 3/1989 | Carpenter | 224/30 R |
| 4,958,761 | 9/1990 | Tenney | 224/316 |

FOREIGN PATENT DOCUMENTS

| | | | |
|---|---|---|---|
| 2560835 | 9/1985 | France | 224/42.03 B |
| 2612954 | 9/1977 | German Democratic Rep. | 224/316 |
| 3643355 | 6/1988 | German Democratic Rep. | 224/30 R |

Primary Examiner—Henry J. Recla
Assistant Examiner—Robert M. Fetsuga
Attorney, Agent, or Firm—H. Jay Spiegel

[57] ABSTRACT

The present invention relates to a shield device designed to be mounted on a vehicle mounted bicycle rack and bicycle to reduce wind resistance and to protect the bicycle from stones or other debris while said bicycle is being transported.

18 Claims, 2 Drawing Sheets

SHIELD

BACKGROUND OF THE INVENTION

The present invention relates to a shield device designed to be mounted on the forward portion of a bicycle rack mounted on the roof of a vehicle to reduce wind resistance and to protect bicycles mounted on the rack from stones and other debris.

The following prior art is known to Applicant:

U.S. Pat. No. 3,596,974 to Adams discloses an air current deflecting device for use with a vehicle pulling a trailer or the like. This device comprises an adjustable shield and its support members and which is detachably secured to the roof of the vehicle. Of course, Adams is different from the teachings of the present invention for reasons including the fact that Adams does not attach to a roof mounted bicycle rack and a bicycle that is mounted on said rack.

U.S. Pat. No. 4,607,874 to Peairs discloses an air deflector apparatus for trucks that is adjustable between a lower position and an upright position. The Peairs reference is different from the present invention in that it does not include the concept of attaching a shield device to a roof mounted bicycle rack and bicycle.

U.S. Pat. No. 4,206,942 to Nudo, et al. discloses a lightweight cargo protecting and air flow drag-reducing wind deflector that is attachable to the roofs of vehicles. This deflector utilizes an easily adjustable mechanism that provides for compact storage and optimal wind resistance reduction. Again, the present invention is different from the teachings of Nudo, et al. in that there is no suggestion of a shielding device attached to a roof mounted bicycle rack and bicycle.

Applicant is unaware of any prior art teaching a device designed to be mounted on a forward portion of a bicycle rack mounted on the roof of a vehicle to reduce wind resistance and to protect bicycles mounted on the rack from stones and other debris.

SUMMARY OF THE INVENTION

The present invention relates to a shield device for vehicle mounted bicycles. The present invention includes the following interrelated aspects and features:

(a) In a first aspect, the inventive shield device comprises a shield means made to attach to any conventional vehicle mounted bicycle rack and a bicycle mounted on the rack.

(b) The shield means has two sets of tracks, an upper and a lower track, each track having connected thereto, a plurality of adjustable clamping means. Each adjustable clamping means on the lower track has a means to fasten and lock the adjustable clamping means to the vehicle mounted bicycle rack. Each adjustable clamping means connected to the upper track also has means to fasten and lock the clamping means to the handlebars or other parts of a bicycle mounted on said bicycle rack.

(c) The shield means has a generally concave shape and may include further curved edges along its periphery, the shield means being of a size sufficient to direct air currents around a mounted bicycle and to protect the bicycle from stones or other debris.

(d) The shield means may be made from any lightweight material having sufficient strength to act as a protecting means and wind resistance reducing means.

Accordingly, it is a first object of the present invention to provide a new and improved shield device for reducing wind resistance and protecting bicycles while they are being transported.

It is a further object of the present invention to provide a shield means that is adjustable and lockable to accommodate different-sized vehicle mounted bicycle racks and bicycles.

It is a yet further object of the present invention to provide a shield means having a generally concave shape that is made of a lightweight material with sufficient strength to act as an air current deflecting means and protecting means in a variety of colors and designs.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
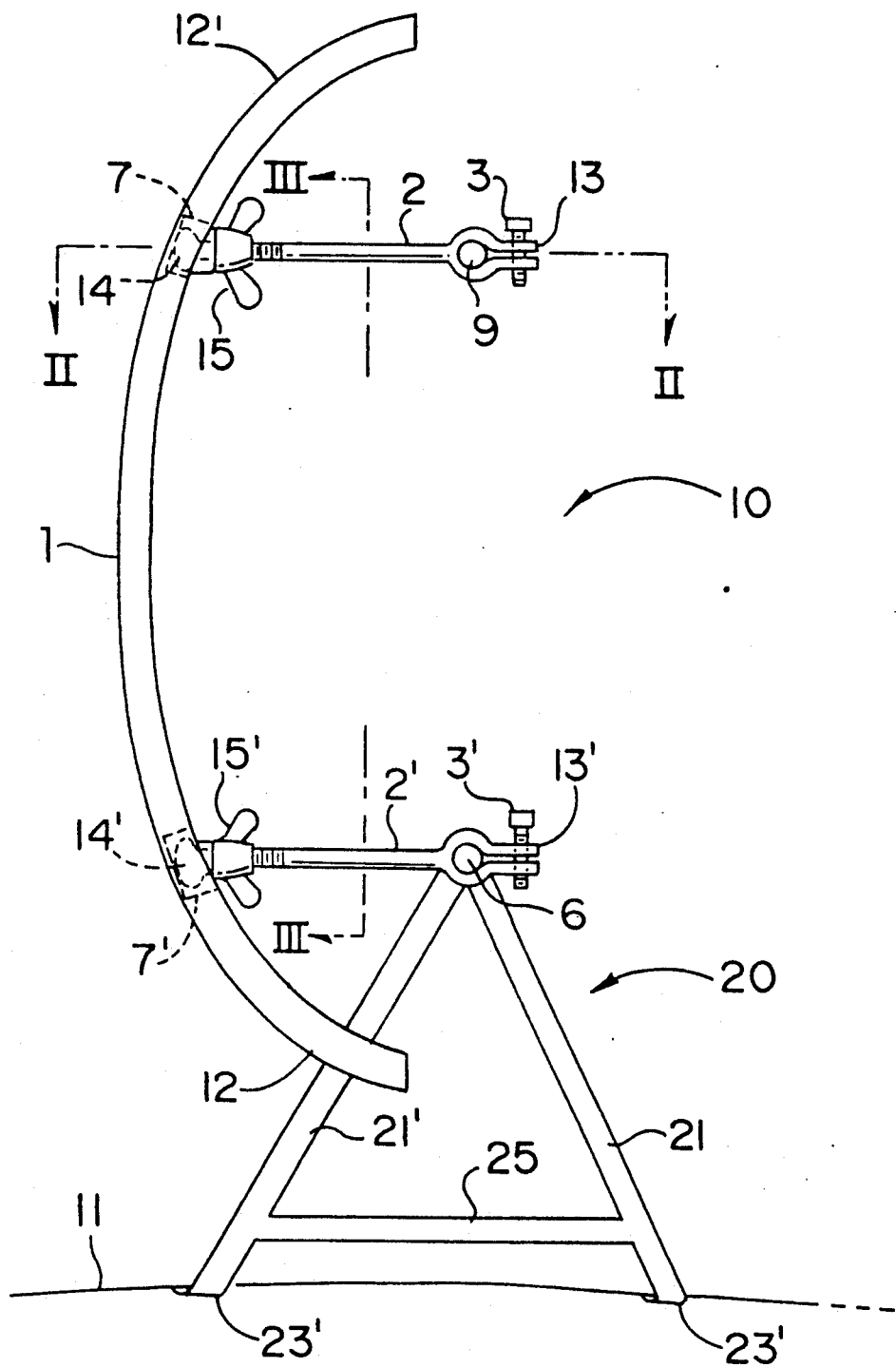
FIG. 1 shows a side view of the present invention.

With reference, first, to FIG. 1, the inventive device is generally designated by the reference numeral 10 and is seen to include a shield means 1, first and second adjustable clamping means 2 and 2', each first and second adjustable clamping means having a clamping end portion 13 and 13' and an opposed sliding and pivoting end portion 14 and 14', respectively, first fastening and locking means 3 and 3' attached to the adjustable clamping means and first and upper and lower tracks 7 and 7'. The shield means 1 is mounted to a vehicle mounted bicycle rack generally designated by the reference numeral 20 by attaching the clamping means 2' to a horizontal crossbar support means 6 of said bicycle mounting rack 20. The vehicle mounted bicycle rack 20 is seen to be mounted to the vehicle surface 11 by engaging a lip portion 23' of rack mount support means 21 and 21', means 21 and 21' connected by crosspiece support means 25.

The shield means 1 is depicted with a generally concave shape having further curved edges 12 and 12' to minimize wind resistance. Of course, any curved shape or design aiding in the minimization of wind resistance may be utilized for the shield means.

Although a vehicle mounted bicycle rack having triangular shaped support means 21, 21' and 25 is shown in FIG. 1, any conventional bicycle rack may be used in combination with the shield device of the present invention. Furthermore, any known type of adjustable clamping means and fastening and locking means may be utilized in place of the depicted means 2, 2', 3, 3' of FIG. 1 to accommodate different designs of bicycle racks and bicycles such as a nut and bolt assembly, flexible strapping, or hook and pile fastening means. As should be understood from FIG. 1, the front wheel of the bicycle must be removed to facilitate attachment of the bicycle to the rack in the manner disclosed.

Figure 2:
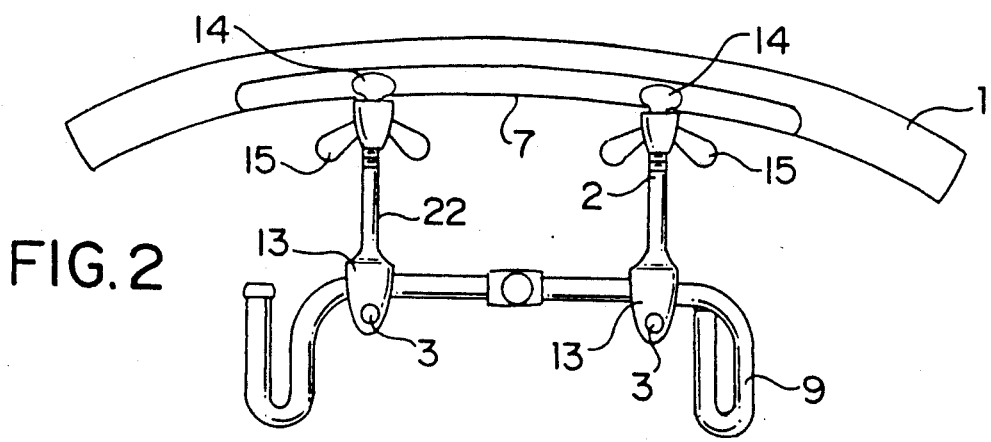
FIG. 2 shows a cross-sectional view along the line II—II of FIG. 1.

With reference to FIG. 2, a cross-sectional view of FIG. 1 along the depicted line II—II shows the first adjustable clamping means 2 and tightening screws 3 attached to a set of bicycle handlebars 9. Although FIG. 2 depicts the adjustable clamping means attached to the handlebars of a bicycle, the adjustable clamping means may be designed to adapt other parts of the bicycle such as the frame, forks, seat or tires.

Figure 3:
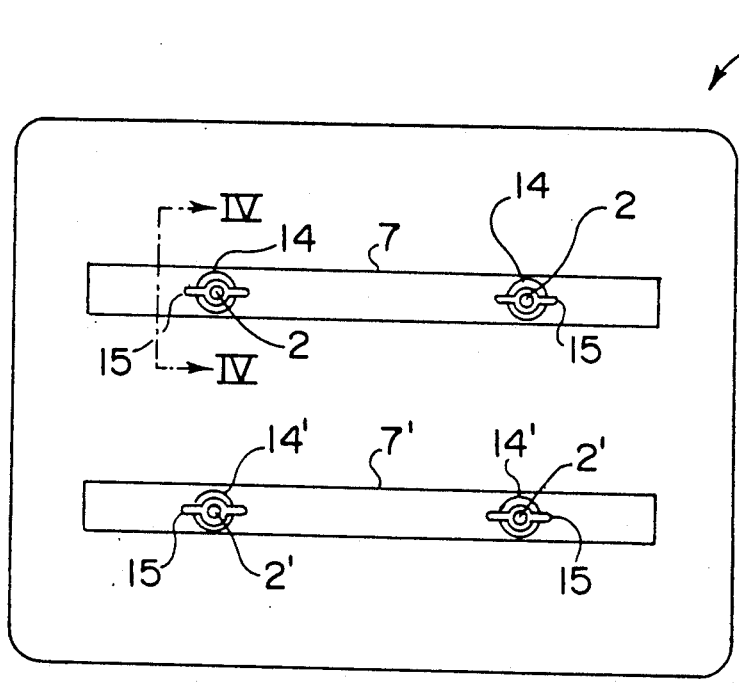
FIG. 3 shows a cross-sectional view along the line III—III of FIG. 1.

FIG. 3 illustrates another cross-sectional view of FIG. 1 as along the line III—III illustrating the upper and lower tracks 7 and 7'. These tracks are shown to be recessed within the shield means and allow the adjustable clamping means 2 and 2' to slide and pivot along the length of the tracks to accommodate different sizes and types of bicycle racks and bicycles. Although these tracks are shown to be in a recessed configuration with respect to the shield means, they may also be mounted on the surface of the shield means by appropriate mounting means as well.

Figure 4:
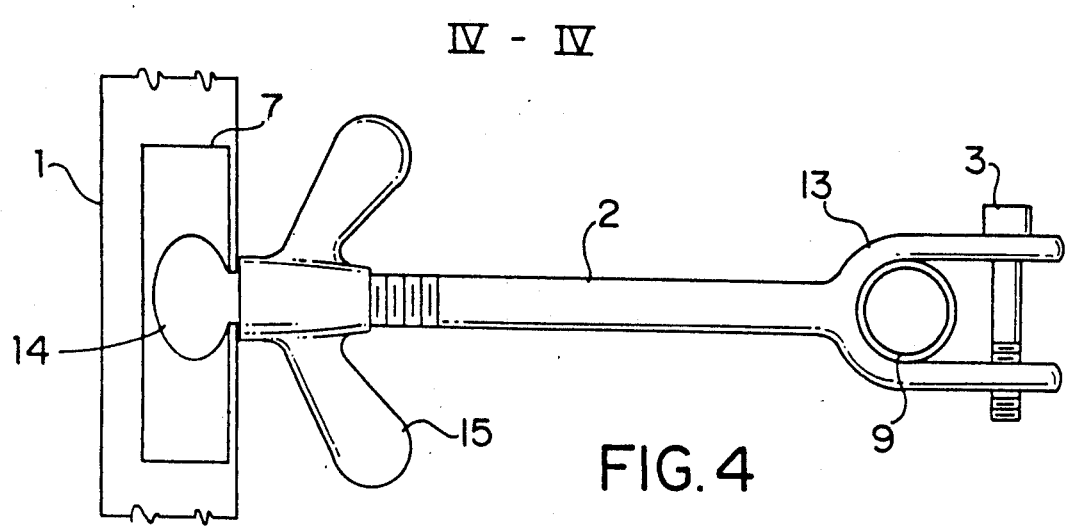
FIG. 4 shows a cross-sectional view along the line IV—IV of FIG. 3.

With reference to FIG. 4, a cross-sectional view of FIG. 3 along the line IV—IV illustrates the sliding and pivoting end portions 14 of adjustable clamping means 2 in track means 7 with greater detail of the second fastening and locking means 15. As can be seen from the drawing the sliding and pivoting end portion 14 has a threaded portion 8 and second fastening and locking means 15 threadably engaged therewith. Once the adjustable clamping means 2 are positioned to secure the shield device first fastening and locking means 15 is tightened to prevent movement of adjustable clamping means 2 in track means 7. Of course, other conventional securing means may be utilized in place of the fastening and locking means 3.

The shield means may be made of any lightweight material that has sufficient strength to resist damage by stones or other debris that may come in contact with the shield and deflect the air currents encountered while the bicycles are in transport. Preferred materials for the shield means include aluminum or its alloys or a reinforced plastic material such as glass or carbon fiber reinforced polyester. The adjustable clamping means may be made of any desired material or materials, including the same material as the shield means, providing that the material has the sufficient strength to support the shield means when attached to the bicycle rack and the bicycle.

Of course, the shield means may be made of any size or shape so long as the shield means is of sufficient area to both deflect air currents around the bicycle and bicycle rack and to protect the bicycle from damage by any stones or other debris. Additionally, the shield means may be made in any color or design to accommodate the individual preferences of the user.

As such, an invention has been disclosed in terms of a preferred embodiment thereof which fulfills each and every one of the objects of the present invention as set forth hereinabove and which provides a new and improved shield for a bicycle being transported on a vehicle mounted bicycle rack.

Of course, many changes, modifications and alterations in the teachings of the present invention may be contemplated by those skilled in the art without departing from the intended spirit and scope thereof. As such, it is intended that the present invention only be limited by the terms of the appended claims.

I claim:

1. In the combination of a bicycle rack mountable on a surface of a vehicle and a bicycle mounted on said bicycle rack with the front wheel removed, the improvement comprising a shield device for protecting said bicycle during transport thereof further comprising:
   a) shield means having a generally curved shape;
   b) a first attachment means on said shield means for attaching said shield means to said bicycle rack;
   c) a second attachment means on said shield means for attaching said shield means to said bicycle; and
   d) said first and second attachment means being sized and shaped such that said shield means is positioned in front of said bicycle when mounted on said rack and further occupies the space normally occupied by said front wheel;
   e) said shield means further including horizontal track means mounted thereon for engaging each said first and said second attachment means to said shield means.

2. The shield device of claim 1 wherein said first and said second attachment means adjustably mount to said shield means.

3. The shield device of claim 1 wherein said shield means is made from an aluminum or fiber reinforced material.

4. The shield device of claim 1 wherein each said first and said second attachment means includes a sliding and pivoting end portion adapted to engage said horizontal track means.

5. The shield device of claim 1 including fastening and locking means mounted on each said first and said second attachment means to secure each said first and said second attachment means to said shield means, said fastening and locking means further securing said first attachment means to a said bicycle rack and said second attachment means to a said bicycle.

6. A shield device for protecting a bicycle during transport thereof, said bicycle being mounted to a bicycle rack with the front wheel removed, said bicycle rack being mountable on a surface of a vehicle, said shield device comprising:
   a) shield means having a generally curved shape;
   b) a first attachment means on said shield means for attaching said shield means to said bicycle rack;
   c) a second attachment means on said shield means for attaching said shield means to said bicycle; and
   d) said first and second attachment means being sized and shaped such that said shield means is positioned in front of said bicycle when mounted on said rack and further occupies the space normally occupied by said front wheel;
   e) said shield means further including horizontal track means mounted thereon for engaging each said first and said second attachment means to said shield means.

7. The shield device of claim 6 wherein each said first and said second attachment means adjustably mount to said shield means.

8. The shield device of claim 6 wherein said shield means is made from an aluminum or fiber reinforced material.

9. The shield device of claim 6 wherein each said first and said second attachment means includes a sliding and pivoting end portion adapted to engage said horizontal track means.

10. The shield device of claim 6 including fastening and locking means mounted on each said first and said second attachment means to secure each said first and said second attachment means to said shield means, said fastening and locking means further securing said first attachment means to a said bicycle rack and said second attachment means to said bicycle.

11. In the combination of a bicycle rack mountable to a surface of a vehicle, said bicycle rack having a horizontal cross support means, and a bicycle mounted on said bicycle rack, the improvement comprising a shield device for protecting said bicycle from damage due to stones and minimizing wind resistance while said bicycle is being transported on said vehicle, said shield device further comprising:

a) a shield means having a generally curved shape for minimizing wind resistance, said shield means having upper and lower track means located thereon;

b) a pair of first and second adjustable clamping means, each having a respective sliding and pivoting end portion and respective opposed clamping end portion, each said respective sliding and pivoting end portions of each respective said first adjustable clamping means engaged in said upper track, each said respective sliding and pivoting end portion of each said respective second adjustable clamping means engaged in said lower track, said respective sliding and pivoting end portions of each said respective first and second adjustable clamping means being adapted to slide and pivot along its respective upper and lower track means, said opposed clamping end portions of each respective said first adjustable clamping means adapted to clamp said first adjustable clamping means to a portion of said bicycle, said opposed clamping end portions of each respective said second adjustable clamping means adapted to clamp said second adjustable clamping means to said horizontal cross support means of said bicycle rack;

c) a plurality of first fastening and locking means, each being located adjacent each of said respective opposed clamping end portions of each respective said first and second adjustable clamping means, each of said first fastening and locking means adapted to secure said opposed clamping end portions of each respective said first adjustable clamping means to a portion of said bicycle, each of said first fastening and locking means adapted to secure said opposed clamping end portions of each respective said second adjustable clamping means to said horizontal cross support means of said bicycle rack; and d) a plurality of second fastening and locking means each being located adjacent each respective said sliding and pivoting end portion of said respective first and second adjustable clamping means, said second fastening and locking means adapted to prevent movement of each of said respective sliding and pivoting end portions of each respective said first and second adjustable clamping means in said upper and lower track means.

12. The shield device of claim 11 wherein said shield means is made of an aluminum or reinforced plastic material.

13. The shield device of claim 11 wherein said upper and lower track means are recessed in said shield means.

14. The shield device of claim 11 wherein said portion of said bicycle are handlebars.

15. A shield device for protecting a bicycle from damage due to stones and minimizing wind resistance while said bicycle is mounted on a bicycle rack, said bicycle rack mountable on a surface of a vehicle and having a horizontal cross support means, said shield device comprising:

a) a shield means having a generally curved shape for minimizing wind resistance, said shield means having upper and lower track means located thereon;

b) a pair of first and second adjustable clamping means, each having a respective sliding and pivoting end portion and respective opposed clamping end portion, each said respective sliding and pivoting end portion of each respective said first adjustable clamping means engaged in said upper track, each said respective sliding and pivoting end portion of each said respective second adjustable clamping means engaged in said lower track, said respective sliding and pivoting end portions of each said respective first and second adjustable clamping means being adapted to slide and pivot along its respective said upper and lower track means, said opposed clamping end portions of each respective said first adjustable clamping means adapted to clamp said first adjustable clamping means to a portion of said bicycle, said opposed clamping end portions of each respective said second adjustable clamping means adapted to clamp said second adjustable clamping means to said horizontal cross support means of said bicycle rack;

c) a plurality of first fastening and locking means, each being located adjacent each of said respective opposed clamping end portions of each respective said first and second adjustable clamping means, each of said first fastening and locking means adapted to secure said opposed clamping end portions of each respective said first adjustable clamping means to a portion of said bicycle, each of said first fastening and locking means adapted to secure said opposed clamping end portions of each respective said second adjustable clamping means to said horizontal cross support means of said bicycle rack;

d) a plurality of second fastening and locking means, each being located adjacent each respective said sliding and pivoting end portions of said respective first and second adjustable clamping means, said second fastening and locking means adapted to prevent movement of each of respective said sliding and pivoting end portions of each respective said first and second adjustable clamping means to said upper track means.

16. The shield device of claim 15 wherein said shield means is made of an aluminum or reinforced plastic material.

17. The shield device of claim 15 wherein said upper and lower track means are recessed in said shield means.

18. The shield device of claim 15 wherein said portion of said bicycle are handlebars.

* * * * *